(12) United States Patent
Himmelstoss et al.

(10) Patent No.: US 9,285,473 B2
(45) Date of Patent: Mar. 15, 2016

(54) RADAR SENSOR AND METHOD FOR CONTROLLING SAME TO REDUCE THE CROSSTALK OF DIGITAL SIGNALS TO THE HF RADAR SIGNAL

(75) Inventors: Armin Himmelstoss, Weissach Im Tal (DE); Dirk Steinbuch, Wimsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 647 days.

(21) Appl. No.: 13/583,466

(22) PCT Filed: Jan. 11, 2011

(86) PCT No.: PCT/EP2011/050267
§ 371 (c)(1),
(2), (4) Date: Nov. 15, 2012

(87) PCT Pub. No.: WO2011/110371
PCT Pub. Date: Sep. 15, 2011

(65) Prior Publication Data
US 2013/0057428 A1 Mar. 7, 2013

(30) Foreign Application Priority Data
Mar. 8, 2010 (DE) .......................... 10 2010 002 638

(51) Int. Cl.
G01S 13/93 (2006.01)
G01S 7/02 (2006.01)
G01S 7/40 (2006.01)
G01S 7/03 (2006.01)

(52) U.S. Cl.
CPC ............... *G01S 13/931* (2013.01); *G01S 7/023* (2013.01); *G01S 7/4008* (2013.01); *G01S 7/032* (2013.01); *G01S 7/038* (2013.01)

(58) Field of Classification Search
CPC ..... G01S 13/931; G01S 7/4008; G01S 7/023; G01S 7/038; G01S 7/032
USPC .................................. 342/82–88, 70–72, 175
See application file for complete search history.

(56) References Cited

U.S. PATENT DOCUMENTS

| | | | | |
|---|---|---|---|---|
| 4,806,937 | A * | 2/1989 | Peil ................................ | 342/175 |
| 4,901,032 | A * | 2/1990 | Komiak ......................... | 330/277 |
| 5,508,706 | A | 4/1996 | Tsou et al. | |
| 5,661,434 | A * | 8/1997 | Brozovich et al. .............. | 330/51 |
| 6,424,223 | B1 * | 7/2002 | Wang et al. .................... | 330/286 |

(Continued)

FOREIGN PATENT DOCUMENTS

| | | |
|---|---|---|
| DE | 197 42 088 | 3/1999 |
| EP | 1821118 | 8/2007 |

(Continued)

OTHER PUBLICATIONS

International Search Report, PCT International Application No. PCT/EP2011/050267, dated May 12, 2011.

*Primary Examiner* — John B Sotomayor
(74) *Attorney, Agent, or Firm* — Kenyon & Kenyon LLP

(57) ABSTRACT

The radar sensor has a transceiver device for generating a radar signal having a settable output power, a control unit and an interface unit. The transceiver device may be controlled via a digital interface via the interface unit and the control unit. One of the lines of the interface is connected to the control unit, the control unit being designed in such a way that when a predetermined level is present on this line, the output power of the transceiver device is lowered.

7 Claims, 2 Drawing Sheets

(56) References Cited

U.S. PATENT DOCUMENTS

| | | | |
|---|---|---|---|
| 7,002,511 B1* | 2/2006 | Ammar et al. | 342/134 |
| 7,068,171 B2* | 6/2006 | Gardenfors et al. | 340/572.1 |
| 7,345,620 B2 | 3/2008 | Voigtlaender et al. | |
| 7,737,871 B2* | 6/2010 | Leung et al. | 341/100 |
| 9,086,485 B2* | 7/2015 | Himmelstoss et al. | |
| 2002/0030591 A1* | 3/2002 | Paranjpe | 340/436 |
| 2004/0008082 A1* | 1/2004 | Dow | 330/51 |
| 2004/0140926 A1* | 7/2004 | Nakamura et al. | 342/70 |
| 2005/0242879 A1* | 11/2005 | Muller | 330/259 |
| 2007/0109070 A1* | 5/2007 | Singh | 333/109 |
| 2009/0251362 A1 | 10/2009 | Margomenos et al. | |
| 2010/0052974 A1* | 3/2010 | Corbe et al. | 342/124 |
| 2012/0154055 A1* | 6/2012 | Yamamoto et al. | 330/299 |
| 2012/0161878 A1* | 6/2012 | Joly et al. | 330/296 |
| 2013/0057428 A1* | 3/2013 | Himmelstoss et al. | 342/175 |

FOREIGN PATENT DOCUMENTS

| | | |
|---|---|---|
| WO | WO 2004/048999 | 6/2004 |
| WO | WO 2004048999 | 6/2004 |

* cited by examiner

_US 9,285,473 B2_

RADAR SENSOR AND METHOD FOR CONTROLLING SAME TO REDUCE THE CROSSTALK OF DIGITAL SIGNALS TO THE HF RADAR SIGNAL

CROSS-REFERENCE TO RELATED APPLICATION

The present application claims priority under 35 U.S.C. §119 to DE 10 2010 002 638.7, filed in the Federal Republic of Germany on Mar. 8, 2010.

FIELD OF THE INVENTION

The present invention relates to a radar sensor having a transceiver device for generating a radar signal, a control unit, and an interface unit for a digital interface for controlling the radar sensor. The present invention additionally relates to a method for controlling such a radar sensor.

BACKGROUND INFORMATION

Radar sensors are used, for example, in motor vehicles to detect the surroundings of the vehicle and to locate preceding vehicles. They may be used as independent distance warning systems or also may be part of a driver assistance system.

For reasons of space, weight, and cost, they are typically implemented in motor vehicles as integrated radar sensor components, so-called monolithic microwave integrated circuits (MMIC), in which the transceiver device for the radar signal is integrated on a chip together with control units and further circuit parts necessary to operate the radar sensor. Because of manifold setting possibilities and of operating states to be monitored for safety reasons, it is hardly possible to implement the setting of operating parameters to control the sensor and the readout of operating states in analog form via separate terminals (pins) of the integrated radar sensor component. It is therefore advisable for the control and for the readout to also integrate an interface unit in the radar sensor component and to exchange control and state information via a digital interface. A serial interface is particularly capable of keeping the number of pins on the housing of the radar sensor component as small as possible. For example, the serial peripheral interface bus (SPI bus), which allows a bidirectional data exchange using three or four pins, has a suitable interface.

Digital signals, e.g., as a clock signal and as a data signal, having a frequency in the range of several hundred kilohertz (kHz) to several megahertz (MHz), are typically used to operate the digital serial interface. Because of the integrated configuration of the radar sensor, however, crosstalk of the digital signals into the transceiver device of the radar sensor is unavoidable. This results in the occurrence of interfering side lines or side bands in the frequency spectrum of the emitted radar signal during operation of the digital interface. Since the side bands are outside the frequency band permissible for the radar transmitter, permitted radiation limiting values may be exceeded by the side bands.

SUMMARY

It is therefore an object of the present invention to provide a radar sensor having a transceiver device, a control unit, and an interface unit for a digital interface for controlling the transceiver device, in which an emission of transmitted power on side lines which are caused by the interfaces is lowered as much as possible. It is a further object of the present invention to provide a method for controlling a radar sensor in which there is as little interfering radiation as possible on such side lines.

In accordance with the present invention, an example radar sensor has one of the lines of the digital interface connected to the control unit, the control unit being designed in such a way that upon the presence of a predetermined level on this line, the output power of the transceiver device is lowered. Due to the direct linking of the output power to the level on one of the lines of the digital interface, the output power of the transceiver device is immediately lowered during a use of the digital interface for the data transmission to control the radar sensor or to read out operating states of the radar sensor. The radiation power in the interfering sideband also decreases with the lowered output power. The interfering sideband still occurs, but limiting values may be easily maintained due to the lowered output power. Due to the dual use of the line of the interface for the interface itself and for the power lowering, a terminal pin which is otherwise required for lowering the output power may additionally be saved.

In a preferred embodiment, the digital interface of the radar sensor is a serial interface having lines for a selection signal, a clock signal, and at least one data signal. The line for the selection signal is connected to the control unit for lowering the output power of the transceiver device. The selection line is typically used to activate an interface for a data transmission. It is particularly preferable to select the predetermined level on the line for the selection signal, at which the output power of the transceiver device is lowered, in such a way that it corresponds to a level at which the interface is activated for a data transmission. The linking of the lowering of the output power of the transceiver device to the selection signal ensures that a lowering occurs during every operation of the interface.

The present invention is explained in greater detail below on the basis of an exemplary embodiment with the aid of two figures.

DETAILED DESCRIPTION OF EXAMPLE EMBODIMENTS

Figure 1:
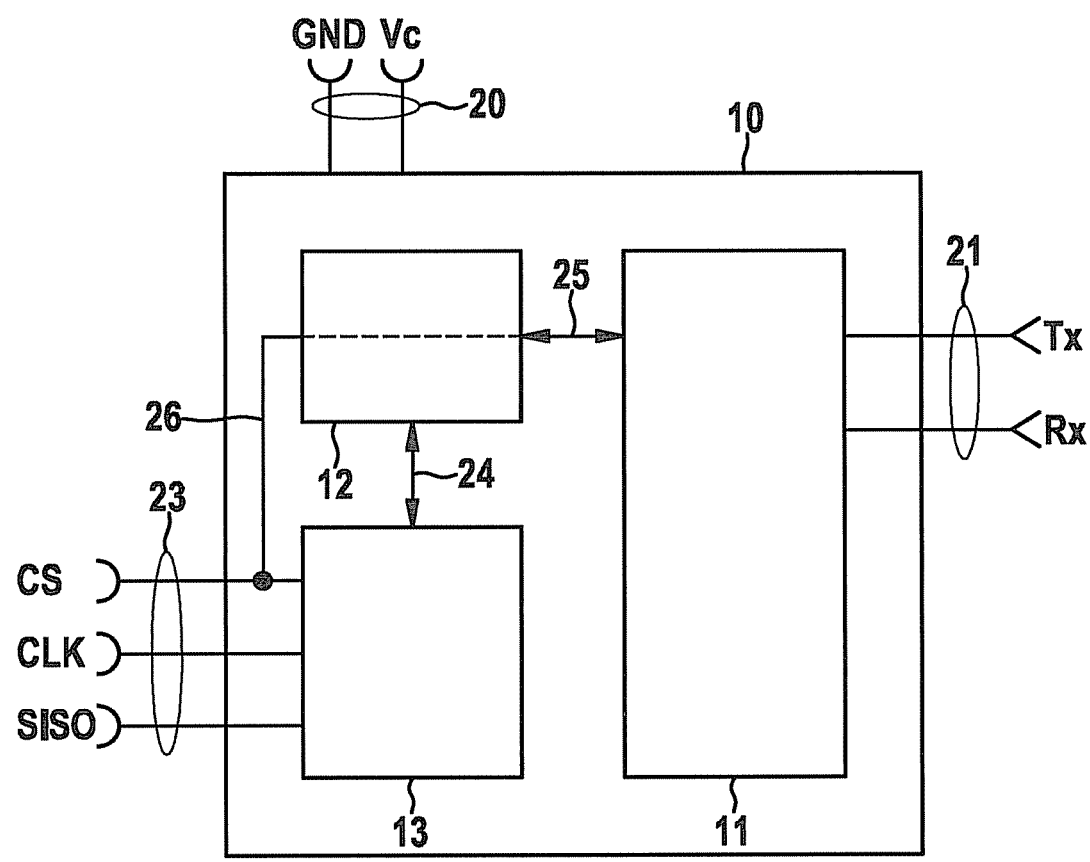
FIG. 1 shows a block diagram of a radar sensor according to the present invention.

FIG. 1 shows a radar sensor, implemented as an integrated MMIC component 10, in a block diagram. The radar sensor includes a transceiver device 11 for a high-frequency radar signal, a control unit 12, and an interface unit 13.

Transceiver device 11 may include a high-frequency oscillator, a reception amplifier, and mixers for generating intermediate frequencies, for example. The configuration of such transceiver devices 11 is known and is not the object of the present application. The present invention may be implemented independently of the precise configuration using any radar sensor in which crosstalk of digital signals of an interface of the radar sensor occurs. This is the case in particular in monolithic integrated radar sensors due to the compact design.

Power terminals 20 are led out of MMIC component 10 as terminal pins for the power supply of the radar sensor, for example, a ground line GND and a positive power supply line Vc. Furthermore, high-frequency terminals 21 are led out, for example, a transmission line Tx to emit the radar signal and a reception line Rx to receive a reflected radar signal. The number of high-frequency terminals 21 is exemplary; it is also possible to provide multiple transmission lines Tx and/or multiple reception lines Rx, e.g., in connection with so-called phased array antenna systems. It is also possible to use the present invention in an integrated radar component, which only has a transmission unit, but not a reception device.

Further terminals of MMIC component 10 are the terminals of a digital interface 23, which are applied to interface unit 13. For example, interface 23 is implemented as a so-called three-phase interface, which represents a particular specific embodiment of the serial peripheral interface bus (SPI bus). It has a line for a selection signal CS (chip select), a line for a clock signal CLK (clock), and a line for a data signal SISO (signal in-signal out).

Inside MMIC component 10, interface unit 13 is connected via an internal connection 24 to control unit 12, and this is in turn connected via an internal connection 25 to transceiver device 11. Interface unit 13 is typically notified of an incoming data transmission by a level change of selection signal CS of interface 23. Clock signal CLK is then turned on, typically a (symmetrical) square-wave signal in the range of several hundred kilohertz (kHz) to several megahertz (MHz), and subsequently information is transmitted via data signal SISO. The information which is received and analyzed by interface unit 13 causes, via internal connection 24, for example, a setting of transmission and reception parameters of transceiver device 11. For this purpose, digital/analog converters may be provided in control unit 12, whose outputs act on transceiver device 11 via internal connection 25. Vice versa, operating states of transceiver device 11 may be queried via the analog/digital converter provided in control unit 12 via interface unit 13.

In the radar sensor according to the present invention, selection signal CS is additionally directly supplied to control unit 12 via a further internal connection 26. Control unit 12 is designed to directly lower the output power of transceiver device 11 via internal connection 25, in the presence of the electrical level of selection signal CS, which also activates interface unit 13 for a data transmission. It may be provided that the corresponding control line of internal connection 25 for the output power is set to a predefined value via a changeover switch. The value may be permanently predefined. In an alternative embodiment, it may be provided that control unit 12 has a separate digital/analog converter, whose output provides the predefined value for setting the lowered output power. In this case, the magnitude of the lowered output power may be set via digital interface 23, optionally within certain limits.

The magnitude of the lowered output power should be determined in any case in such a way that the power emitted into the side bands, which are formed as sum and difference frequency bands from the interference of the radar signal and cross-talking digital signals of interface 23, falls below permissible limiting values. A lowering to an output power of zero, i.e., a deactivation of the transmitter, is also conceivable. However, a merely lowered output power offers the advantage that applications such as adaptive cruise control or object tracking, which require a continuous radar signal, are not interrupted. However, a temporarily poor signal quality due to the lowered output power is generally acceptable.

In a further alternative embodiment, it is also possible to use clock signal CLK for a lowering of the output power. In such a case, a monostable timer may be started via a level or flank recognition, so that a signal may be derived from clock signal CLK, which has a constant level for the duration of the application of clock signal CLK and which is supplied via internal connection 26 to control unit 12 for controlling the output power.

Figure 2:
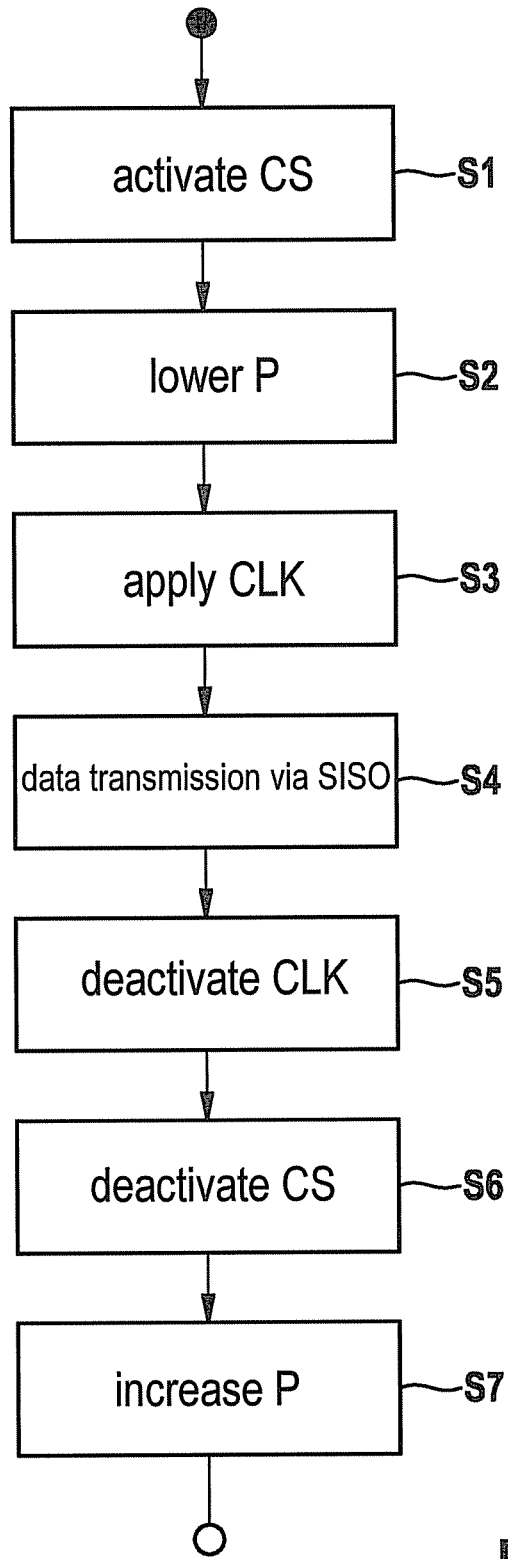
FIG. 2 shows a flow chart of a method for controlling a radar sensor.

FIG. 2 shows a flow chart of an example method according to the present invention for controlling a radar sensor, which may be carried out in connection with MMIC component 10 shown in FIG. 1, for example. Reference numerals used hereafter identify identical or identically acting elements as described in conjunction with FIG. 1.

In a first step S1, selection signal CS is applied at a predetermined level to activate interface 23. Depending on the logic convention used, this level may correspond to a logical 0 or logical 1, for example.

In a subsequent step 82, this predetermined level is recognized and output power P of the radar sensor is lowered to a predetermined value. This lowering occurs immediately and without a data transmission being necessary via interface 23.

In a next step 83, clock signal CLK is turned on. Subsequently, in a step 84, a data exchange is carried out using data signal SISO of interface 23. This data exchange may be used to set operating parameters or to read out operating states of the radar sensor. A change of output power P of the radar sensor for the normal operating state, in which no lowering of the output power occurs, is also possible. Such a change of output power P would not be implemented immediately, however. A corresponding programming command would initially only change the output signal of a corresponding digital/analog converter, whose output determines output power P in the normal operating state. The actual setting of this output power P would only take place after the operating state at lowered output power had ended and the normal operating state was set again.

In subsequent steps S5 and S6, clock signal CLK is initially removed from the respective line of interface 23 and subsequently selection signal CS is reset to the original level, at which interface unit 13 is not activated. In a subsequent step 87, the original level of selection signal CS is detected and the output power of the radar sensor is set to the value for the normal operating state. The output power either corresponds to the value present before the beginning of the method or to a value which was newly set within the scope of the data transmission of step S4.

What is claimed is:

1. A radar sensor comprising:
   a transceiver device to generate a radar signal, output power of the transceiver device being settable;
   a control unit; and
   an interface unit including a digital interface to control the transceiver device, wherein:
      the digital interface is a serial interface that includes a plurality of lines;
      the plurality of lines include a line for a selection signal, a line for a clock signal, and a line for at least one data signal;
      the line for the selection signal is connected to the control unit; and
      the control unit is configured to lower the output power of the transceiver device in response to the line for the selection signal being set at a predetermined level.

2. The radar sensor as recited in claim 1, wherein the radar sensor is configured for the line for the selection signal to be at the predetermined level whenever the interface unit is activated for a data transmission via the digital interface.

3. The radar sensor as recited in claim 1, wherein the lowering of the output power, which the control unit is configured to perform, is to a value that is predefined as a target value.

4. The radar sensor as recited in claim 3, wherein the target value is predefined for the output power, emitted into side bands, to fall below a limiting value.

5. The radar sensor as recited in claim 1, wherein the transceiver device is integrated on a Monolithic Microwave Integrated Circuit (MMIC) chip.

6. A method for controlling a radar sensor having a transceiver device for generating a radar signal, the transceiver device having a settable output power which is settable by a control unit via a digital interface, the method comprising:
- lowering the output power of the transceiver device, by the control unit, in response to a line for a selection signal being set at a predetermined level;

wherein:
- the digital interface is a serial interface that includes a plurality of lines;
- the plurality of lines include the line for the selection signal, a line for a clock signal, and a line for at least one data signal; and
- the line for the selection signal is connected to the control unit.

7. The method as recited in claim 6, wherein the clock signal is applied to the digital interface only when the interface is activated for a data transmission via the selection signal.

* * * * *